United States Patent
Hart et al.

(10) Patent No.: US 11,022,988 B1
(45) Date of Patent: Jun. 1, 2021

(54) FLOW LIMITER FOR REGULATORS

(71) Applicant: Emerson Process Management Regulator Technologies, Inc., McKinney, TX (US)

(72) Inventors: Justin Wade Hart, Melissa, TX (US); Thomas Leroy Weyer, Frisco, TX (US)

(73) Assignee: Emerson Process Management Regulator Technologies, Inc., McKinney, TX (US)

(*) Notice: Subject to any disclaimer, the term of this patent is extended or adjusted under 35 U.S.C. 154(b) by 1 day.

(21) Appl. No.: 16/696,096

(22) Filed: Nov. 26, 2019

(51) Int. Cl.
*G05D 16/06* (2006.01)
*F16K 7/17* (2006.01)
*F16K 17/04* (2006.01)
*G05D 16/04* (2006.01)

(52) U.S. Cl.
CPC ............ *G05D 16/0688* (2013.01); *F16K 7/17* (2013.01); *F16K 17/0486* (2013.01); *G05D 16/0402* (2019.01); *Y10T 137/7831* (2015.04)

(58) Field of Classification Search
CPC .......... G05D 16/0683; G05D 16/0686; G05D 16/0688; G05D 16/0402; G05D 16/0404; Y10T 137/783; Y10T 137/7831; F16K 1/44; F16K 17/0486; F16K 17/04; F16K 17/02; F16K 17/048
See application file for complete search history.

(56) References Cited

U.S. PATENT DOCUMENTS

| | | | | |
|---|---|---|---|---|
| 1,545,990 A | * | 7/1925 | Weeks | G05D 16/0683 251/58 |
| 2,086,037 A | * | 7/1937 | Kronmiller | G05D 23/1919 236/80 R |
| 2,581,071 A | * | 1/1952 | Born | G05D 16/0688 137/458 |
| 2,619,983 A | * | 12/1952 | Roberts | G05D 16/02 137/484.8 |
| 2,698,026 A | * | 12/1954 | Roberts | G05D 16/0694 137/458 |
| 3,160,169 A | * | 12/1964 | Peterson | G05D 16/0683 137/315.42 |

(Continued)

FOREIGN PATENT DOCUMENTS

| | | | | |
|---|---|---|---|---|
| CH | | 574068 A5 | * 3/1976 | ........... F16K 17/048 |
| DE | | 29506395 U1 | * 6/1995 | ......... G05D 16/0402 |

OTHER PUBLICATIONS

Types 1098-EGR and 1098H-EGR Pressure Reducing Regulators, instruction manual, Feb. 2016, copyright Emerson Process Management Regulator Technologies, Inc. 2001, 2016; 44 pages.

(Continued)

*Primary Examiner* — David Colon-Morales
(74) *Attorney, Agent, or Firm* — Quarles & Brady LLP

(57) ABSTRACT

A control assembly can be configured for use with a pressure regulator having a valve body defining a fluid flow path. The control assembly can include a control member, a stem, and a lever, and can be disposed within the pressure regulator to selectively control fluid flow. The control assembly can include a primary control member and a secondary control member, or a mechanical stop that can operate to restrict flow along the fluid flow path, including when the stem disconnects from the lever.

20 Claims, 10 Drawing Sheets

(56) References Cited

U.S. PATENT DOCUMENTS

| | | | | |
|---|---|---|---|---|
| 3,228,417 A * | 1/1966 | Schwerter | G05D 16/0683 | 137/461 |
| 3,386,465 A * | 6/1968 | Johnson | G05D 16/0694 | 137/463 |
| 3,424,194 A * | 1/1969 | Hetz | F16K 17/044 | 137/461 |
| 3,542,052 A * | 11/1970 | Irwin | F16K 17/048 | 137/116.5 |
| 3,580,271 A * | 5/1971 | Farrer | G05D 16/0694 | 137/458 |
| 3,599,658 A * | 8/1971 | Kruzan | G05D 16/0683 | 137/116.5 |
| 3,623,506 A * | 11/1971 | Bonner | F16K 17/22 | 137/613 |
| 3,722,536 A * | 3/1973 | Hill | G05D 16/0683 | 137/505.46 |
| 3,754,570 A * | 8/1973 | Hughes | G05D 16/0688 | 137/613 |
| 3,809,108 A * | 5/1974 | Hughes | G05D 16/0694 | 137/73 |
| 3,892,255 A * | 7/1975 | Johnson | G05D 16/0683 | 137/116.5 |
| 3,971,410 A * | 7/1976 | St. Clair | G05D 16/0694 | 137/613 |
| 4,019,531 A * | 4/1977 | Johnson | G05D 16/0688 | 137/504 |
| 4,195,656 A * | 4/1980 | Kanerva | G05D 16/0688 | 137/458 |
| 4,503,883 A * | 3/1985 | Meacham, Jr. | G05D 16/0686 | 137/458 |
| 5,402,820 A * | 4/1995 | Duffy | G05D 16/0683 | 137/505 |
| 8,151,822 B2 * | 4/2012 | Kranz | G05D 16/0683 | 137/505.12 |
| 8,240,327 B2 * | 8/2012 | Hawkins | G05D 16/163 | 137/489.5 |
| 8,256,446 B2 * | 9/2012 | Hawkins | G05D 16/0683 | 137/116.5 |
| 8,256,452 B2 * | 9/2012 | Hawkins | G05D 16/0688 | 137/505.46 |
| 8,500,092 B2 | 8/2013 | Quijano | | |
| 9,310,811 B2 * | 4/2016 | Zhou | F16K 31/165 | |
| 10,883,717 B2 * | 1/2021 | Hawkins | F23K 5/147 | |
| 2004/0187930 A1 * | 9/2004 | Hawkins | G05D 16/0686 | 137/505.47 |
| 2008/0257424 A1 | 10/2008 | Quijano | | |
| 2012/0103440 A1 * | 5/2012 | Chizek | G05D 16/0688 | 137/528 |
| 2013/0255791 A1 | 10/2013 | Nashery et al. | | |
| 2017/0108881 A1 | 4/2017 | Welch, II et al. | | |
| 2019/0277496 A1 | 9/2019 | Hawkins | | |

OTHER PUBLICATIONS

Types 1098-EGR and 1098 H-EGR Pressure Reducing Regulators, bulletin 71.2:1098-EGR; copyright Emerson Process Management Regulator Technologies, Inc. 2001, 2016; 24 pages.

* cited by examiner

FLOW LIMITER FOR REGULATORS

BACKGROUND

Pressure regulators can be used in a variety of industrial, commercial, and other settings including to regulate the pressure of a gas flowing from a pressure source. In some applications, it may be useful to increase or decrease the pressure of the gas flowing from the pressure source toward a downstream application. For example, a pressurized tank of gas may be used to supply gas to an application that uses the gas at a pressure that is lower than the source pressure.

Conventional pressure regulators can include an inlet, an outlet, and a control element positioned between the inlet and the outlet. The control element can be mechanically linked to a diaphragm extending across an internal cavity of a diaphragm case, which is fluidly coupled to the inlet. At least one spring can be attached to the diaphragm within the diaphragm case and pre-tensioned or otherwise adjusted to provide a downward force on the diaphragm. When the pressure in the diaphragm case fluctuates relative to the spring force, the diaphragm can actuate the control element accordingly, via a connecting lever, to widen or narrow the flow path from the inlet to the outlet. Thus, pressure downstream of the regulator can be regulated based on a set point for the spring. Some pressure regulators can also include an internal relief valve to help ensure that downstream structures are not damaged in the event of a wide-open failure (i.e., a failure mode in which the control element is in an open position).

SUMMARY

Some embodiments of the technology provide a pressure regulator that can include a valve body that defines a fluid flow path between an inlet and an outlet, an orifice assembly that is positioned along the fluid flow path, and a stem. A lever can be configured to control movement of the stem when engaged with the stem, as driven by movement of a diaphragm. A primary control member can be coupled to the stem. In a first mode of operation of the pressure regulator, the primary control member can be moveable relative to a first side of the orifice assembly, by movement of the stem, between: a first position in which the primary control member contacts the first side of the orifice assembly to restrict fluid flow along the fluid flow path, and a second position in which the primary control member is separated from the first side of the orifice assembly. A secondary control member can be coupled to the stem and can be moveable, by movement of the stem, relative to a second side of the orifice assembly. In the first mode of operation of the pressure regulator, the secondary control member can be moveable between a first position and a second position, in each of which the secondary control member is separated from the second side of the orifice assembly. In a second mode of operation of the pressure regulator, the secondary control member can be moveable to a third position in which the secondary control member contacts the second side of the orifice assembly to restrict fluid flow along the fluid flow path.

Some embodiments of the technology provide a pressure regulator that can include a valve body that defines a fluid flow path between an inlet and an outlet, an orifice assembly that is positioned along the fluid flow path, a lever configured to be moved by movement of a diaphragm in a first mode of operation of the pressure regulator, and a stem assembly. The stem assembly can include a stem, a primary control member, and a secondary control member. The stem can be operably coupled to the diaphragm (e.g., engaged with the lever in the first mode of operation and can be operably decoupled from the diaphragm (e.g., disengaged from the lever) in a second mode of operation of the pressure regulator. The primary control member can be coupled to the stem on a downstream side of the orifice assembly, and the secondary control member can be coupled to the stem on an upstream side of the orifice assembly. In the first mode of operation, the stem can be movable between first and second orientations. With the stem in the first orientation, the primary control member can be in contact with a first side of the orifice assembly to block flow past the orifice assembly, and with the stem in the second orientation, the primary control member can be separated from the first side of the orifice assembly to permit flow past the orifice assembly. In the second mode of operation, the stem can be movable to a third orientation. The stem moving from the second orientation to the third orientation can move the secondary control member toward a second side of the orifice assembly to restrict flow past the orifice assembly.

Some embodiments of the technology provide a stem assembly for a pressure regulator that can include a valve body that defines a fluid flow path between an inlet and an outlet, an orifice assembly that defines a flow orifice along the fluid flow path, and a lever that is configured to be moved by movement of a diaphragm. The stem assembly can include a stem that is configured to be moved by the lever in a first mode of operation of the pressure regulator and to move freely relative to the lever in a second mode of operation of the pressure regulator. A primary control member can be coupled to the stem, and a secondary control member can be coupled to the stem and can be spaced apart from the secondary control member by an extension portion of the stem. The stem can be configured to be installed in the pressure regulator with the extension portion extending through the flow orifice defined by the orifice assembly, and with the primary control member positioned downstream of the flow orifice and the secondary control member positioned upstream of the flow orifice.

Some embodiments of the technology provide a pressure regulator that can include a valve body that defines a fluid flow path between an inlet and an outlet, an orifice assembly that is positioned along the fluid flow path, and a stem. A lever can be configured to control movement of the stem when engaged to the stem, as driven by movement of a diaphragm. A control member can be coupled to the stem, and a mechanical stop can be coupled to the stem. In a first mode of operation of the pressure regulator, the control member can be moveable relative the orifice assembly between a first position in which the control member contacts the orifice assembly to restrict fluid flow along the fluid flow path and a second position in which the control member is separated from the orifice assembly. The mechanical stop can be configured to engage a stop feature, in a second mode of operation of the pressure regulator, to prevent the control member from moving past a third position.

Some embodiments of the technology provide a pressure regulator that can include a valve body that defines a fluid flow path between an inlet and an outlet, an orifice assembly that is positioned along the fluid flow path, a lever configured to be moved by movement of a diaphragm in a first mode of operation of the pressure regulator, and a stop feature. A stem assembly can include a stem, a control member, and a mechanical stop. The stem can be connected by the lever to the diaphragm in the first mode of operation and not connected by the lever to the diaphragm in a second mode of operation of the pressure regulator. In the first mode of operation, the stem can be movable between first and second orientations, as controlled by the diaphragm via the lever. With the stem in the first orientation, the control member can be in contact with the orifice assembly to block flow past the orifice assembly. With the stem in the second orientation, the control member can be separated from the orifice assembly to permit flow past the orifice assembly. In the second mode of operation, the stem can be movable past the second orientation to a third orientation, in which the control member is spaced farther from the orifice assembly than when the stem is in the second orientation. The stop feature can be disposed to engage the mechanical stop, in the second mode of operation, to define the third orientation and to prevent movement of the stem past the third orientation.

Some embodiments of the technology provide a stem assembly for a pressure regulator. The pressure regulator can include a valve body that defines a fluid flow path between an inlet and an outlet, an orifice assembly that defines a flow orifice along the fluid flow path, a stop feature, and a lever that is configured to be moved by movement of a diaphragm. The stem assembly can include a stem, a control member, and a mechanical stop on the stem. The stem can be configured to be moved by the lever in a first mode of operation of the pressure regulator and to move freely relative to the lever in a second mode of operation of the pressure regulator. The control member can be coupled to the stem and can be configured to block or permit flow past the orifice assembly depending on an orientation of the stem. In the second mode of operation, the mechanical stop can be configured to engage the stop feature, upon movement of the lever in a first direction, to stop further movement of the stem in the first direction and thereby limit a spacing between the control member and the orifice assembly.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
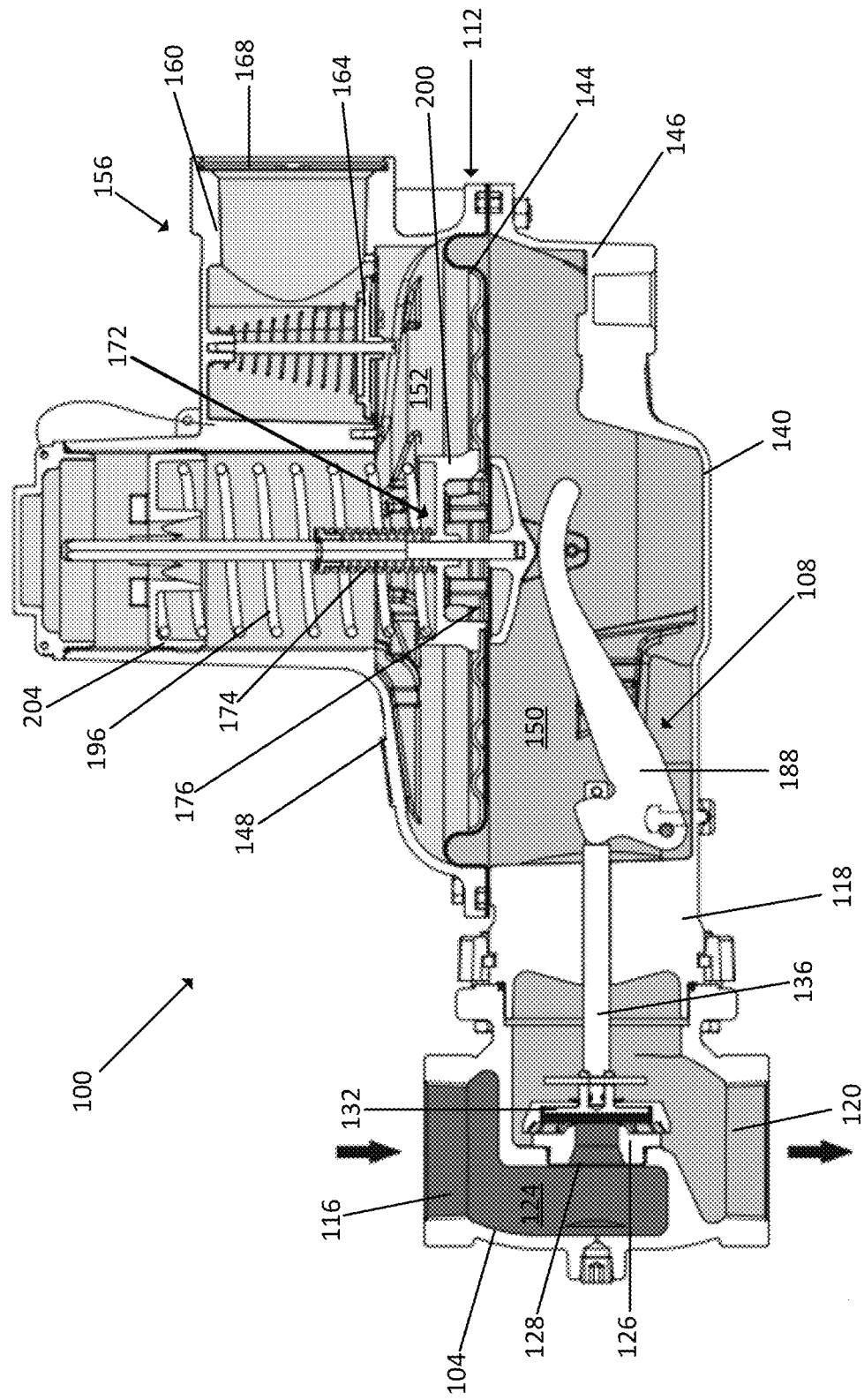
FIG. 1 is a cross-sectional view of a conventional pressure regulator.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," "secured," and "coupled" and variations thereof, as used with reference to physical connections, are used broadly and encompass both direct and indirect mountings, connections, supports, and couplings. Further, unless otherwise specified or limited, "connected," "attached," or "coupled" are not restricted to physical or mechanical connections, attachments or couplings.

As noted above, pressure regulators can be used to regulate the pressure of gas flows in a variety of contexts. In some configurations, a failure mode of a conventional pressure regulator can allow gas to flow relatively unimpeded through the pressure regulator. Accordingly, it may be necessary to size internal pressure relief valves or pressure relief valves at other locations to accommodate relatively large flow volumes or pressures. This can lead to substantial increases in overall cost and in system complexity.

Embodiments of the invention can address this issue, and others, including by providing mechanical devices that can automatically regulate pressure of a gas flow during possible failure-mode operation of a regulator, such as after lever-disconnect events. For example, in some embodiments, a stem assembly of a pressure regulator can include primary and secondary control members on opposing sides of an orifice assembly of the pressure regulator. Via movement of the stem, the primary control member can operate to block or permit flow across the orifice assembly during a first mode of operation (e.g., normal operation) and the secondary control member can operate to block or otherwise restrict flow across the orifice assembly during a second mode of operation (e.g., after a lever disconnect event or other failure).

As another example, in some embodiments, a mechanical stop can be provided on a stem of a pressure regulator. During a first mode of operation, the mechanical stop may permit the stem, and an associated control member, to move freely, in order to block or permit flow across an orifice assembly of the pressure regulator. In contrast, during a second (e.g., lever-disconnect) mode of operation, the mechanical stop can contact a stop feature of the pressure regulator to limit movement of the control member away from the orifice assembly and thereby limit a maximum flow capacity of the pressure regulator.

FIG. 1 depicts one example of a conventional pressure regulator 100. The pressure regulator 100 is generally configured to use in an internal environment (e.g., in a residential building), but the pressure regulator 100 or other pressure regulators on which embodiments of the invention can be implemented can also be installed in an external environment (e.g., outdoors). In this example, the pressure regulator 100 includes a valve body 104, a control assembly 108, an actuator assembly 112, and an internal relief valve 172. In other examples, however, other configurations of pressure regulators are possible, including other configurations on which embodiments of the invention can be beneficially employed.

The valve body 104 defines a fluid inlet 116, a fluid outlet 120, and a fluid flow path 124. The fluid flow path 124 extends between the fluid inlet 116 and the fluid outlet 120 when the pressure regulator 100 is in an open configuration (not shown). A flow orifice 128 is disposed in the valve body 104, along the fluid flow path 124, as defined by an orifice assembly 126 disposed between the fluid inlet 116 and the fluid outlet 120. Although the orifice assembly 126 is shown as a single-piece insert with opposing (upstream and downstream) seats for control members, other orifice assemblies can be integrally formed with a valve body, or can be formed as multi-piece assemblies that collectively define a sealable flow orifice with one or more valve seats.

As further described below, the control assembly 108 is configured for displacement in the valve body 104, relative to the orifice assembly 126, to control the flow of fluid through the orifice 128. In the embodiment illustrated, the control assembly 108 includes a control member configured as a valve plug 132, a lever 188, and a valve stem 136 that connects the valve plug 132 to the lever 188, although other configurations are possible. When the pressure regulator 100 is in a closed configuration, as illustrated in FIG. 1, the valve plug 132 is positioned against (i.e., seated on) the orifice assembly 126 thus blocking the flow of process fluid along the flow path 124 (i.e., preventing fluid at the inlet 116 from flowing to the outlet 120).

The actuator assembly 112 is operatively connected to the valve body 104 to control the position of the control assembly 108 relative to the orifice assembly 126. The actuator assembly 112 includes a housing 140, a diaphragm 144 disposed within the housing 140, and a linkage operatively connecting the diaphragm 144 to the control assembly 108. The actuator housing 140 is formed of a diaphragm case 146 and a spring case 148 that are secured together, such as with one or more bolts connecting respective outer flanges of the cases 146, 148. The diaphragm 144 separates the housing 140 into a first chamber 150 and a second chamber 152. The first chamber 150 is defined at least partly by one side of the diaphragm 144 and the diaphragm case 146. The second chamber 152 is defined at least partly by the other side of the diaphragm 144 and the spring case 148.

An exhaust vent 156 is formed in the spring case 148 and extends into the second chamber 152. The exhaust vent 156 includes an orifice 160 that extends from a vent inlet 164 to a vent outlet 168. The vent inlet 164 is in fluid communication with the second chamber 152 and the vent outlet 168 is in fluid communication with the surrounding ambient atmosphere, such that the exhaust vent 156 fluidly connects the second chamber 152 to the surrounding ambient atmosphere. Correspondingly, in some configurations, the second chamber 152 can be maintained at a pressure that is approximately equal to the pressure of the surrounding ambient atmosphere.

An internal relief valve 172 is formed in the diaphragm 144 and is regulated by a non-adjustable relief spring 174. The internal relief valve 172 provides overpressure protection to the downstream system by relieving fluid through the diaphragm 144 to atmosphere in the event of overpressure. Any pressure above the start-to-discharge point of the non-adjustable relief spring 174 moves the diaphragm 144 off the relief seat 176 allowing excess pressure to discharge through the exhaust vent 156.

To control flow through the regulator 100 during normal operation, a first end of the lever 188 is operatively connected to the linkage for the diaphragm 144 and a second end of the lever 188 is operatively connected to the valve stem 136. Accordingly, movement of the diaphragm 144 in response to pressure changes in the first chamber 150 (and at the outlet 120) causes the linkage to move the lever, as further detailed below, which shifts the control assembly 108 to maintain the process fluid within a pre-selected pressure range at the fluid outlet 120.

The actuator assembly 112 also includes a control spring 196, a first spring seat 200, and a second spring seat 204. The first spring seat 200 is disposed on top of the diaphragm 144 within the second chamber 152 of the actuator housing 140, and receives and supports a first end of the control spring 196. The second spring seat 204, which likewise is disposed within the second chamber 152, receives a second end of the control spring 196 opposite the first end. So arranged, the control spring 196 biases the diaphragm 144 in a direction against the fluid pressure (e.g., a downward direction in the orientation shown in FIG. 1) with a selected force, to maintain the pressure of the process fluid within the pre-selected range at the fluid outlet 120. The force exerted by the control spring 196 can be adjusted via the second spring seat 204 or via any other known means, e.g., an adjusting screw. As illustrated in FIG. 1, the actuator assembly 112 may also include components such as, for example, a valve plug and a release spring that are disposed in the internal relief valve 172 and serve to damp the response of the pressure regulator 100.

As noted briefly above, with the pressure regulator 100 configured as shown, the diaphragm-based actuator assembly 112 controls the position of the valve plug 132 of the control assembly 108, relative to the orifice assembly 126, to satisfy desired process control parameters (e.g., a desired set-point pressure). The spring 196 of the actuator assembly 112 naturally biases the diaphragm 144 downward relative to the orientation of FIG. 1, which translates, via the lever 188, into a bias of the control assembly 108 toward an open position (i.e., with the valve plug 132 positioned away from the orifice assembly 126). However, an increase in pressure at the outlet 120, as communicated to the first chamber 150 (e.g., via a throat across the wall 118), can urge the diaphragm 144 upward. Sufficient pressure increase at the outlet 120 can thereby overcome the force applied by the spring 196 to move the diaphragm 144 (e.g., upward in the orientation shown in FIG. 1). This movement of the diaphragm, in turn, can move the lever 188, the valve stem 136, and the valve plug 132 toward the closed position (as shown in FIG. 1). In contrast, when the fluid pressure at the outlet 120 decreases sufficiently, such as in response to an increase in fluid demand downstream of the pressure regulator 100, the spring 196 can overcome the decreased fluid pressure in the first chamber 150 and move the diaphragm 144 (e.g., downward) to move the lever 188, the valve stem 136, and the valve plug 132 back toward the open position.

During use, the pressure regulator 100 can be subject to vibration-induced wear or other adverse effects. In some cases, this can result in a disconnect failure, in which the lever 188 disconnects from the valve stem 136, or the mechanical link from the diaphragm 144 to the valve stem 136 is otherwise broken. A disconnect failure, or other component failures such as diaphragm 144 perforation, can sometimes lead to wide-open type failures, in which the control assembly 108 remains uncontrollably open and the pressure regulator 100 is no longer able to satisfactorily regulate flow. Thus, for example, the internal relief valve 172 as described above, or other downstream relief valves, can be provided for overpressure protection. However, in high volume flow applications, appropriately sized relief valves may be bulky, costly, or otherwise less than desirable. For example, in order to effectively provide overpressure protection, the size of the internal relief valve 172 (or other relief valve) may be partly dictated by the size of orifice 128, which may be relatively large in high volume flow applications.

As also noted above, in view of these issues and others, it can be useful to provide a control assembly having a secondary control member or a mechanical stop to help to block or otherwise restrict flow through a pressure regulator, including during operation after a lever-disconnect failure or other failure event. In this way, for example, the size of an internal or other relief valve (e.g., the valve 172) can be reduced in size, because the need to match the relief valve to the full capacity of a main orifice of the regulator (e.g., the orifice 128) can be reduced. Accordingly, in some embodiments and as further detailed below, a secondary control member can be coupled to a valve stem to restrict fluid flow from an upstream side of a regulator orifice, or a mechanical stop can be coupled to the valve stem to limit travel of the valve stem in some operating modes.

FIGS. 2a through 2e illustrate a control assembly 208 according to embodiments of the invention that include different secondary control members. Generally, the control assembly 208 can be used in a variety of different pressure regulators, including those configured similarly to the pressure regulator 100 (see FIG. 1), with a main flow orifice through an orifice assembly and a diaphragm that is configured to move a lever to control flow through the main flow orifice. For example, the pressure regulator 100 can be modified to include part or all of the control assembly 208, can be originally manufactured with the control assembly 208, or can be retrofitted to receive the control assembly 208 in place of the control assembly 108 as illustrated in FIG. 1. Accordingly, for the example presented herein, the control assembly 208 is discussed in the context of the orifice 128 and the orifice assembly 126. In other embodiments, however, the control assembly 208 or other control assemblies according to the invention can be used with other orifice assemblies.

In the illustrated embodiment, the control assembly 208 includes a lever 288, which is configured to be attached to an actuator assembly (e.g., the assembly 112 shown in FIG. 1) and a stem assembly 238. The stem assembly 238 has a primary control member 232 and a secondary control member 234, both of which are secured to a valve stem 236. The primary control member 232 can be configured as a valve plug or disc, or another mechanical structure or assembly that can selectively limit flow through an orifice (e.g., the orifice 128 of FIG. 1). The lever 288 is mechanically coupled to a distal end of valve stem 236, and the primary and secondary control members 232, 234 are mechanically (e.g., rigidly) coupled to a proximal end of the valve stem 236. In some embodiments, the primary and secondary control members 232, 234 can be molded together as a unitary part with a portion of, or all of, the valve stem 236. In some embodiments, the control members 232, 234 can be separately formed and then later secured (e.g., pinned or clipped) to the valve stem 236.

To accommodate flow through the relevant regulator orifice, the primary and secondary control members 232, 234 are spaced apart from each other on the valve stem 236. In particular, an extension portion 240 of the stem extends between the primary and secondary control members 232, 234. In some embodiments, the extension portion 240 can be separate from a main rod of the valve stem 236, and can exhibit a different diameter or composition from the main rod. In some embodiments, the extension portion 240 can be integrally formed with one or more of the control members 232, 234 or the main rod of the valve stem 236.

Usefully, the extension portion 240 exhibits a length that is sized so that, when the control assembly 208 is installed for use, the primary control member 232 is positioned on the downstream side 220 of the orifice assembly 126, the secondary control member 234 is positioned on the upstream side 216 of the orifice assembly 126, and the extension portion 240 of the valve stem 236 extends through the orifice 128 defined by the orifice assembly 126. With this arrangement, flow through the orifice assembly 126 can be restricted (e.g., blocked) on either side 220, 216, by the primary control member 232 or the secondary control member 234, respectively. For example, as the control assembly 208 is actuated by a diaphragm, the primary and secondary control members 232, 234, can restrict flow by partially or completely sealing the corresponding downstream or upstream side 220, 216 of the orifice assembly 126.

In different embodiments, control members can exhibit different forms. For example, in FIGS. 2a through 2e, the primary control member 232 is a solid disk having a chamfered edge on the non-sealing side, and in FIGS. 2a through 2c, the secondary control member 234 is a solid disk without a chamfered edge. In other embodiments, however, other configurations are possible, including compound configurations (i.e., multi-piece or multi-material configurations) and configurations with geometries other than those shown in FIGS. 2a through 2c (e.g., as illustrated for the valve plug 132 in FIG. 1).

Figure 2A:
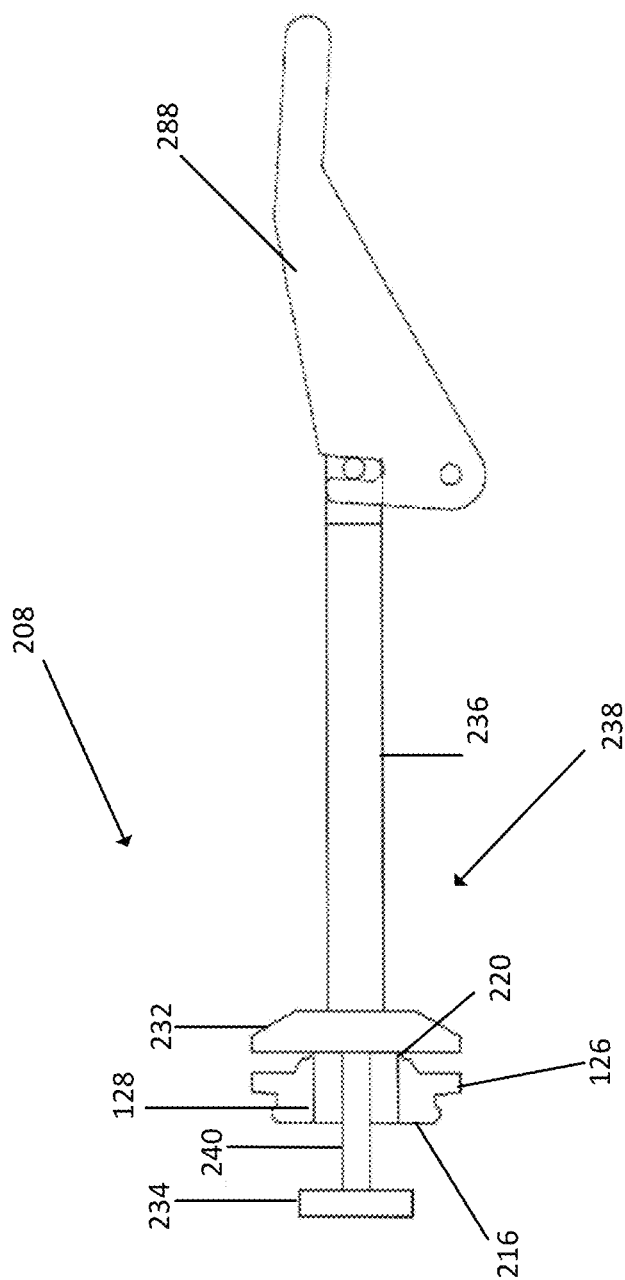
FIGS. 2a through 2c are cross-sectional views of a control assembly according to an embodiment of the invention, with a stem assembly in first, second, and third orientations respectively.
Figure 2B:
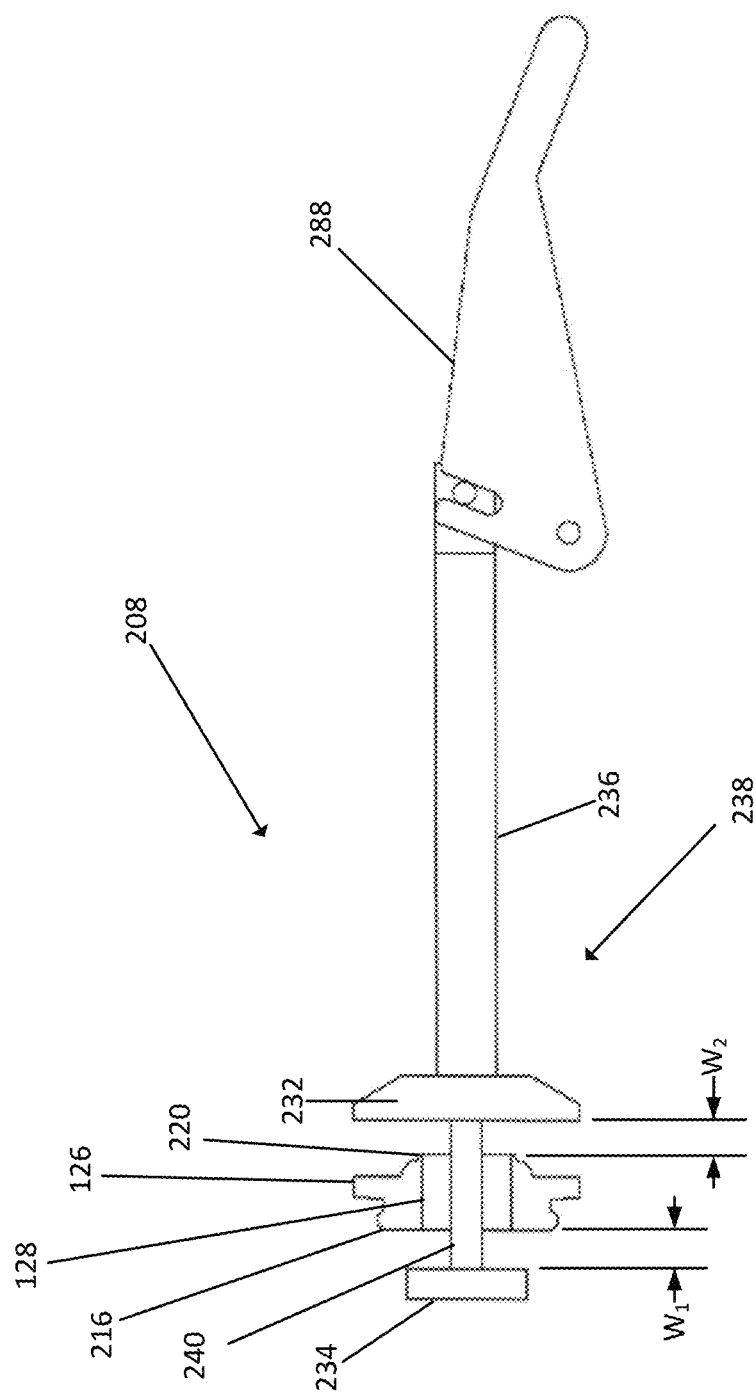
Figure 2C:
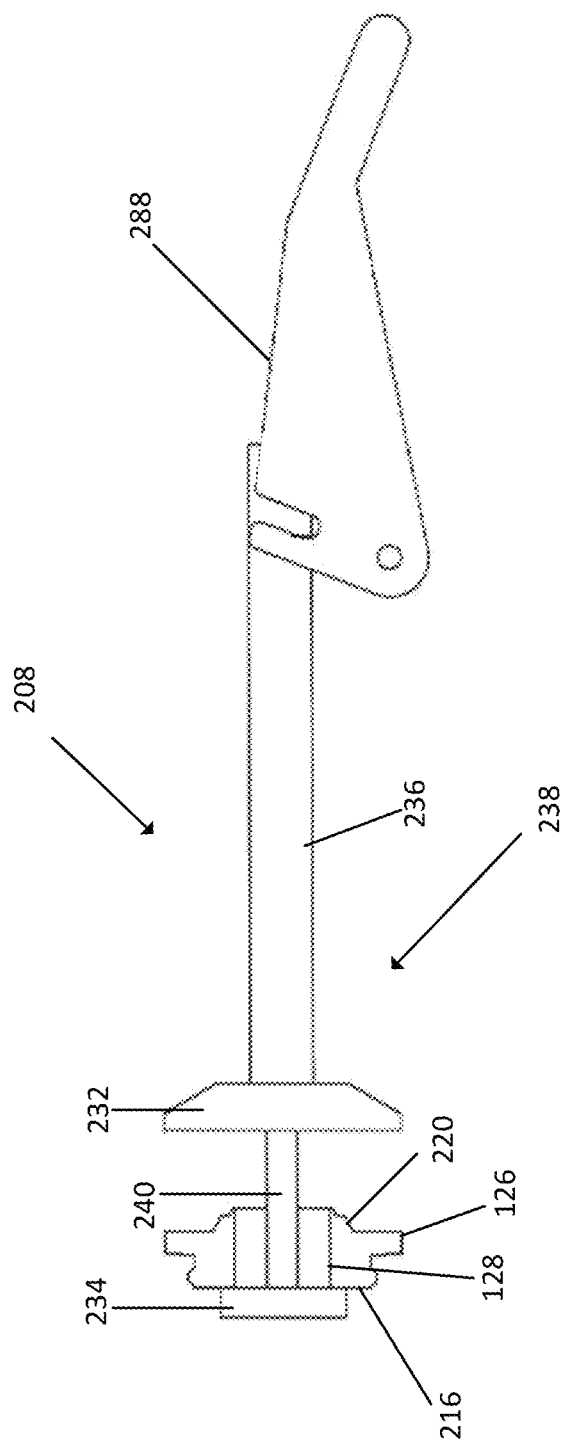
Figure 2D:
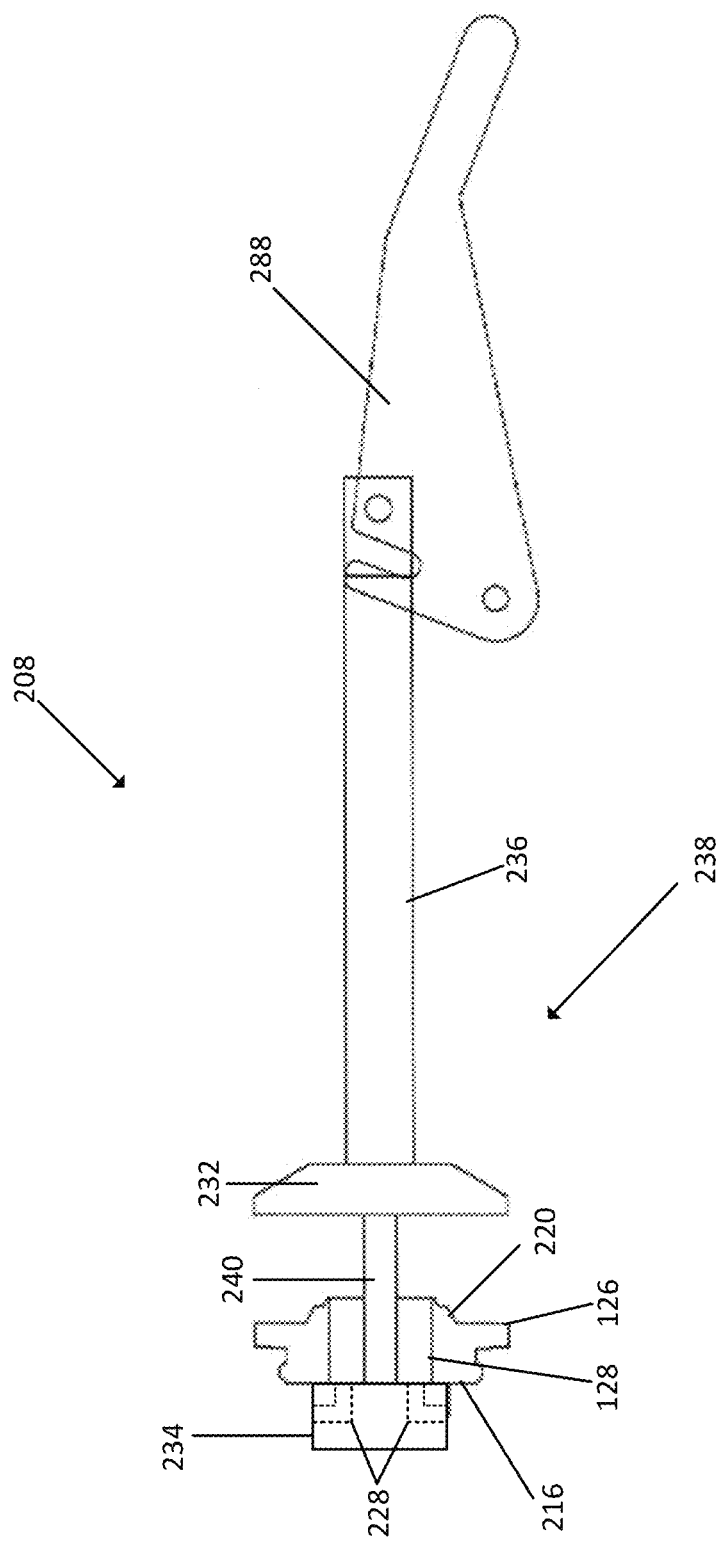
FIG. 2d is a cross-sectional view of a control assembly according to an embodiment of the invention, the control assembly having a secondary control member with passageways.
Figure 2E:
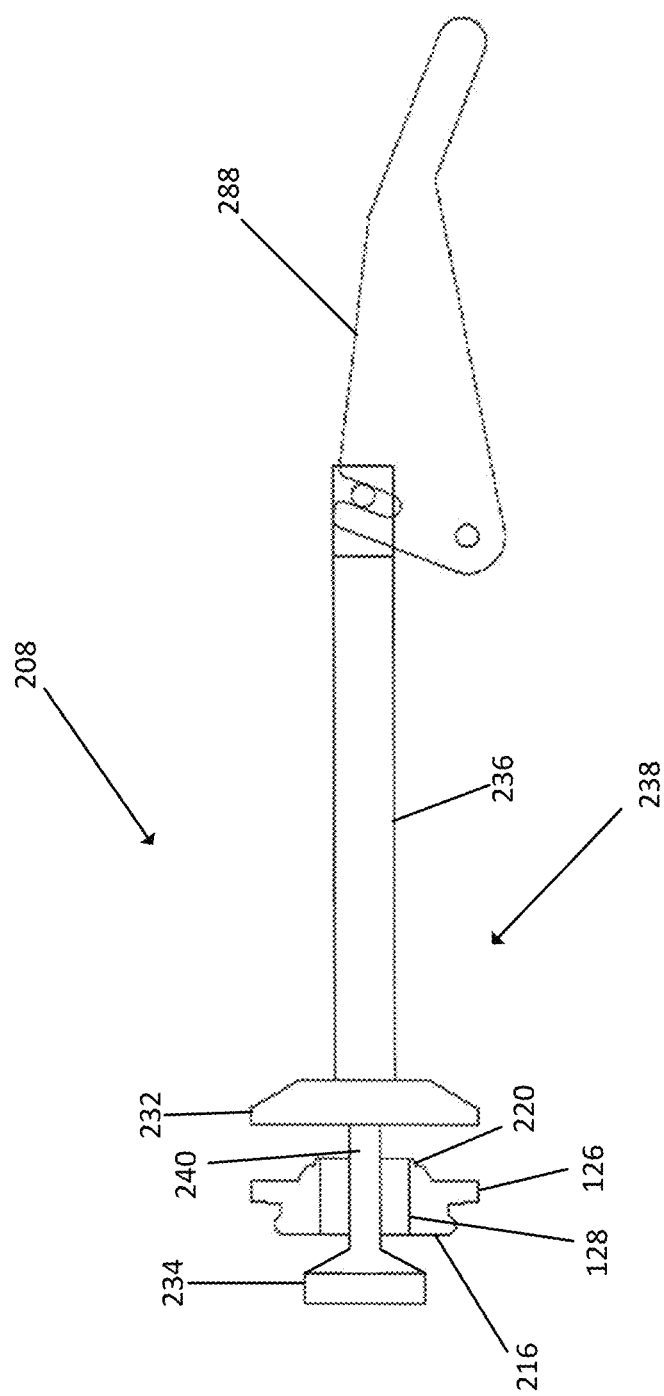
FIG. 2e is a cross-sectional view of a control assembly according to an embodiment of the invention, the control assembly having a secondary control member with a ramped surface.

As one example of an alternative configuration for a control member, as shown schematically in FIG. 2d, a secondary control member 234A includes passageways 228 that allow a secondary fluid flow into the fluid inlet 116, including when the secondary control member 234 contacts the upstream side 216 of the orifice assembly 126. As another example, as shown in FIG. 2e, a secondary control member 234B can include a ramped profile that faces towards and is configured to seat against with the upstream side 216 of the orifice assembly 126. Accordingly, flow can be more gradually restricted as the valve stem 236 moves the control member 234 towards the orifice assembly 126.

In other embodiments, other configurations are also possible. For example, a ramped profile of a secondary control member may be configured differently than shown in FIG. 2e, in order to provide any number of desired flow control characteristics as the secondary control member is moved relative to an orifice assembly. And ramped or other profiles can be otherwise customized in order to provide any variety of continuously increasing (or other) flow restrictions as a secondary control member is moved continuously toward an orifice assembly. In some embodiments, a secondary control member can be configured as a cage, or otherwise configured to include other through-hole arrangements, such as may allow a secondary fluid flow (e.g., similar to the configuration of FIG. 2d). Thus, depending on the needs of a particular application, a secondary control member can be configured to restrict flow across a regulator orifice in a variety of ways, including by fully or partially blocking fluid flow when in a fully closed position (e.g., when seated against the relevant orifice assembly).

Generally, valve stem assemblies with multiple control members, according to embodiments of the invention, can be used to regulate flow in multiple different modes of operation of a regulator. For example, the control assembly 208 can generally regulate flow through the orifice 128 during at least two modes of operation of the relevant pressure regulator. In a first, "attached" mode of operation, the stem 236 is mechanically coupled to the lever 288 (see, e.g., FIGS. 2a and 2b) to transmit movement between the relevant diaphragm and the valve stem 236, as would be the case during normal operation of the pressure regulator 100. During attached operation, the control assembly 208 is translated within the regulator body 104 by the relevant actuator assembly, so that movement of the relevant diaphragm in response to pressure changes causes the lever 288 to move the stem assembly 238.

For the illustrated embodiment, the control assembly 208 is configured to move continuously between two orientations, as illustrated in FIGS. 2a and 2b, when operating in the attached operation mode. Generally, as controlled by the lever 288, the valve stem 236 can freely move between the first and a second orientation during attached operation, although some embodiments may include other control devices that may also affect movement of the valve stem 236.

In particular, FIG. 2a shows the valve stem 236 in a first orientation, in which the primary and secondary control members 232, 234 are in respective first positions. In the embodiment illustrated, the primary control member 232 is fully seated against the orifice assembly 126 in the first position and the fluid flow along a flow path through the regulator (and across the orifice 128) is fully blocked. In contrast, the secondary control member 234 is spaced apart from a seat of the orifice assembly 126 in the first position, such that the secondary control member 234 may provide minimal restriction of flow through the orifice 128 as the valve stem 236 begins to move the primary control member 232 away from the orifice assembly 126 to permit flow through the orifice 128.

FIG. 2b (and FIG. 2e) show the valve stem 236 in a second orientation, in which the primary and secondary control members 232, 234 are in respective second positions. In particular, both of the control members 232, 234 are separated (i.e., spaced apart) from respective sides 220, 216 of the orifice assembly 126, so that neither of the control members 232, 234 fully block flow through the orifice 128.

Depending on the collective configurations of the control members 232, 234, the extension portion 240, and the orifice assembly 126, the control members 232, 234 may still somewhat restrict flow through the orifice 128 when the valve stem 236 is in the second orientation. In some embodiments, as also discussed below, the control members 232, 234 can be configured to be separated from the respective sides 220, 216 of the orifice assembly 126, when the valve stem 236 is in the second orientation, to allow a maximum operational flow capacity through the orifice 128. In this regard, for example, the engagement of the valve stem 236 with the lever 288, with the valve stem 236 in the second orientation, can prevent further movement of the valve stem 236 in a valve-opening direction (e.g., to the right in FIG. 2b) and thereby, in cooperation with the orifice assembly 126 and one or both of the control members 232, 234, define the maximum operational flow capacity of the pressure regulator 100. In other embodiments, however, other positions of the valve stem 236 may correspond to a maximum operational flow capacity.

Continuing, in some embodiments, a second "disconnected" mode of operation can be characterized by a component failure within a pressure regulator, such as diaphragm perforation, a disconnect failure between a lever and a valve stem or a lever and a linkage, or other conditions that may prevent a diaphragm from regulating flow through the pressure regulator. During operation in a disconnected mode of operation, a secondary control member can generally provide a backstop against excessive flow, with the pressure of fluid flow through the relevant regulator tending to move the secondary control member towards the relevant orifice assembly and thereby to decrease the current flow capacity of the regulator as a whole.

As one example, a disconnected mode can be characterized by disconnect of the lever 288 from the valve stem 236, as shown in FIG. 2c (and FIG. 2d). In this case, the lever 288 may accordingly no longer prevent the valve stem 236 from moving in the valve-opening direction. In conventional regulators (e.g., as shown in FIG. 1), this may result in essentially unrestricted flow across the orifice 128. However, as the pressure of fluid moving through the regulator bears on the control members 232, 234, the valve stem 236 can be moved from the second orientation (see, e.g., FIG. 2b) towards a third orientation (see, e.g., FIG. 2c), with the secondary control member 234 correspondingly moving towards the upstream side 216 of the orifice assembly 126. Accordingly, with sufficient pressure, the primary and secondary control members 232, 234 can be moved into respective third positions, with the secondary control member 234 in particular being moved to be seated on the upstream side 216 of the orifice assembly 126.

As shown in FIG. 2c, the primary control member 232 is separated from the downstream side 220 of the orifice assembly 126 at a greater distance when moving to, and when in, the third position than when in the second position. This configuration can correspond to the primary control member 232 imposing reduced flow restriction at the downstream side 220 of the orifice assembly 126. But the corresponding movement of the secondary control member 234 towards the orifice assembly 126 can counterbalance this effect, with a continual increase in flow restriction at the upstream side 216 of the orifice assembly 126 as the secondary control member 234 moves towards the orifice assembly 126, and a corresponding continual decrease in operational flow capacity of the pressure regulator.

In some embodiments, as illustrated in FIG. 2c, a third position of a secondary control member can include the secondary control member seating against the relevant orifice assembly, although other configurations are also possible. Accordingly, depending on the configuration of the secondary control member and the orifice assembly, the third position may correspond with a complete blockage of flow past the orifice assembly, such that the secondary control member can effectively stop flow through the regulator. For example, when configured as a solid disc or other impermeable component, as illustrated for the secondary control member 234 in FIG. 2c, a secondary control member can fully block flow through a regulator when seated against the orifice assembly.

In other embodiments, however, other configurations are possible. In some embodiments, a secondary control member can be configured to restrict, but not fully block, flow through the pressure regulator during disconnected (or other second-mode) operation. For example, a secondary control member can be formed to include a cage (not shown) facing toward the relevant orifice assembly, so that some flow past the orifice assembly may be permitted even when the secondary control member is seated on the orifice assembly. Similarly, as also discussed above, a secondary control member can include passageways (e.g., the passageways 228 in FIG. 2d), that can allow a secondary fluid flow past an orifice assembly even when the secondary control member is seated on the orifice assembly. In such embodiments, the dimensions and other geometry of the relevant passageways (e.g., the passageways 228) or of a cage feature can be selected to define a restricted minimum flow capacity during extended operation in a disconnected (or other) mode. Consistent with other discussion herein, such a restricted minimum flow capacity can sometimes usefully be selected so that a particular internal (or other) relief valve is capable of relieving or otherwise appropriately controlling the maximum possible flow during the disconnected (or other) mode.

As also noted above, in some embodiments, a spacing of control members along a valve stem (e.g., a length of an extension portion) can be configured to provide desired characteristics of operational flow restrictions in different operational modes. In some embodiments, primary and secondary control members may be spaced apart from each other so that movement of the secondary control member towards the orifice assembly during attached operation may not overly restrict overall flow. For example, a minimum spacing of a secondary control member from an orifice assembly during attached operation may be selected to restrict flow into a relevant orifice by no more than the maximum spacing of the primary control member from the orifice assembly during attached operation. In this way, for example, the secondary control member may substantially affect flow through the regulator only upon entry into a disconnected mode, when the secondary member is able to move closer to the orifice assembly.

As one example, as illustrated in FIG. 2b, with the valve stem 236 in the second orientation during attached operation, a minimum distance W1 is defined between the secondary control member 234 and the upstream side 216 of the orifice assembly 126, and a maximum distance W2 is defined between the primary control member 232 and the downstream side 220 of the orifice assembly 126. In particular, in the embodiment illustrated, the extension portion 240 is sized so that when the engagement of the valve stem 236 with the lever 288 constrains the movement of the valve stem 236, the distance W1 and the distance W2 are substantially equal to each other. In this way, for example, in view of the equivalent diameter of the orifice 128 at upstream and downstream sides 216, 220 of the orifice assembly 126, the maximum attached-mode flow capacity of the regulator, is controlled by primary control member 232 and the distance W2 and is not restricted by the secondary control member 234 and the distance W1.

In other embodiments, however, other configurations are possible. For example, in some embodiments, the extension portion 240 can be sized so that, when the lever 288 stops movement of the valve stem 236 in the valve-opening direction, W1 is less than W2. Thus, depending also on the configuration of the orifice 128 and the orifice assembly 126, W1 may define the maximum flow capacity at a fully open configuration. In some embodiments, in contrast, when the lever 288 stops movement of the valve stem 236 in the valve-opening direction, W1 may be greater than W2. Further, as also noted above, the absolute size of the distances between control members and an orifice assembly may not be fully determinative of flow capacity. For example, flow capacities may also be affected by different diameters or other varied geometries at upstream or downstream ends of an orifice, by different geometries of the control members (e.g., ramped geometries, as shown in FIG. 2e), or other factors, and design of control members, extension portions, and other features can be optimized accordingly to provide desired operational flow control.

Thus, some embodiments of the invention can provide improved performance for regulators, including during operation in disconnected modes. For example, upon a lever disconnect event, a secondary control member can be automatically moved by flow through a regulator to restrict (e.g., block) flow through the regulator. In some cases, this arrangement can protect downstream devices from overpressure and generally reduce the required flow capacity of internal or downstream relief valves.

As also noted above, some embodiments can include other features to provide flow control during multiple modes of operation of a regulator, such as mechanical stops on a stem assembly that are configured to contact stop features of a regulator to physically limit movement of the stem assembly. In this regard, for example, FIGS. 3a through 3d illustrate the pressure regulator 100 outfitted with different configurations of a control assembly 308 according to an embodiment of the invention. Generally, the pressure regulator 100 can be modified to include the control assembly 308, can be originally manufactured with the control assembly 308, or can be retrofitted to receive the control assembly 308. Further, in some embodiments, control assemblies similar to the control assembly 308 can be used in regulators configured differently than the regulator 100.

The control assembly 308 generally includes a lever 388 and a stem assembly 338. As similarly discussed relative to the configuration of the conventionally configured regulator 100 of FIG. 1, the lever 388 is mechanically coupled to the distal end of the valve stem 336, and the control member 332 is coupled to the proximal end of the valve stem 336. Thus, during an attached mode of operation, movement of the diaphragm 144 can move the lever 388 to move the valve stem 336 and thereby control flow through the regulator 100.

Figure 3A:
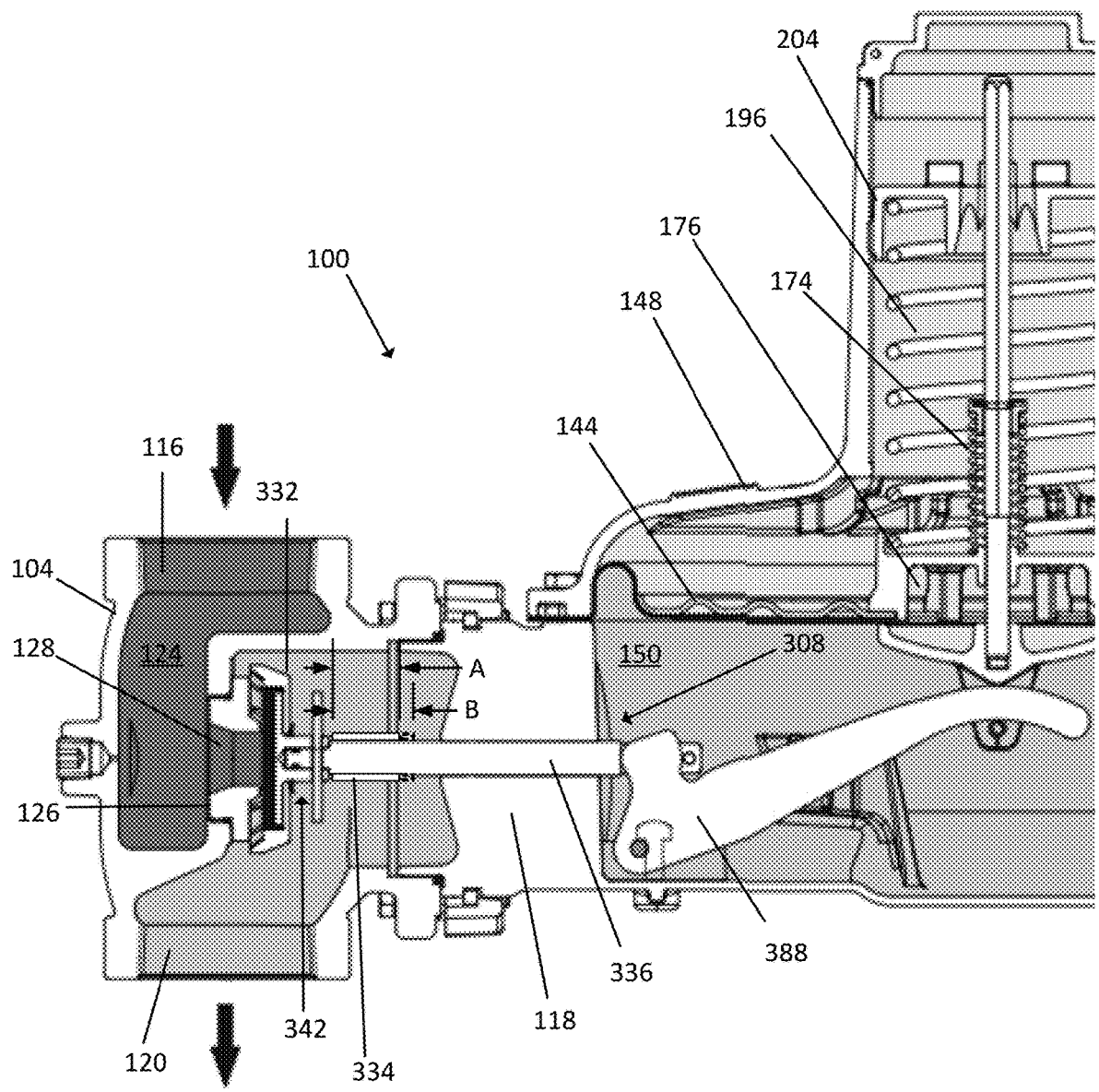
FIGS. 3a through 3d are cross-sectional views of control assemblies according to embodiments of the invention, each of the control assemblies having a mechanical stop.

In the embodiment illustrated in FIG. 3a, the stem assembly 338 has a control member 332, a mechanical stop 334, and a valve stem 336, with the control member 332 and the mechanical stop 334 on an opposite side of the wall 118 from the lever 388 (i.e., on the same side of the wall 118 as the orifice assembly 126). During operation, the mechanical stop 334 is configured to engage a stop feature that is incorporated into the pressure regulator 100 as further described below.

Similar to the control member 232 (see, e.g., FIG. 2a), the control member 332 can be configured as a valve plug or disc, or another mechanical structure that can selectively limit flow though a regulator orifice (e.g., the orifice 128) via interaction with an orifice assembly (e.g., the orifice assembly 126). In the illustrated embodiment, the control member 332 is coupled to the valve stem 336 by way of a connection assembly 342, which can include a weld, pins, mechanical mating features, or any other appropriate structure to couple the control member 332 to the valve stem 336. In other embodiments, other configurations are possible, including configurations with control members that are integrally formed with corresponding valve stems.

In different embodiments, a mechanical stop can be configured in different ways. In some embodiments, a mechanical stop can be configured as a ring that at least partially surrounds a valve stem. For example, FIG. 3a illustrates the mechanical stop 334 as a ring that is formed as an elongate sleeve (i.e., a sleeve having an axial length that is greater than a radius thereof) and that extends along the longitudinal axis of the valve stem 336. In other embodiments, however, other configurations are possible. For example, a mechanical stop configured as a ring can be formed as a disc or generally ring-shaped clip that extends radially outward from the relevant valve stem.

In different embodiments, a mechanical stop can be secured to a valve stem in different ways and at different locations, in order to contact a stop feature and thereby stop movement of the associated control member when the control member is at a particular position within the regulator. For example, a ring shaped mechanical stop can be secured via grooves or ridges (not shown) on a valve stem, using set screws, using snap-on or press-fit connections, using non-threaded pins, or in a variety of other ways. Similarly, mechanical stops can generally be secured to fixed locations on the relevant valve stems, which can be selected from any number of locations along the length of valve stems. Further, some configurations of mechanical stops can be selected to exhibit one (or more) of any variety of lengths. For example, FIG. 3a illustrates two possible lengths A, B for the mechanical stop 334. In some embodiments, a mechanical stop can be indirectly coupled to a valve stem, such as by direct coupling of the mechanical stop to a control element or to a connection assembly that secures a control element to a valve stem.

Generally, as also noted above, when a valve stem equipped with a mechanical stop moves sufficiently beyond a permitted (e.g., first-mode) range of positions, to reach a predetermined (e.g., second-mode) maximum-displacement position, a mechanical stop can contact a corresponding stop feature (or features) to prevent further movement of the associated valve stem. Accordingly, for example, similarly to control assemblies with secondary control members (e.g., the control assembly 208), control assemblies with mechanical stops and stop features can provide flow control in at least two modes of operation: e.g., attached operation and disconnected operation, as described above.

For example, during attached operation of the regulator 100 as equipped with the control assembly 308, the valve stem 336 can move between first and second orientations, with the control member 332 and the mechanical stop 334 in first and second corresponding positions, respectively, for generally conventional control of flow through the regulator 100. In particular, during attached operation, the valve stem 336 can move the control member 332 from a first position in which the control member 332 seats against the orifice assembly 126 and fluid flow through the orifice 128 is fully blocked, and a second position (not shown) similar to the configuration of FIG. 2b, in which the control member 332 is spaced apart from the orifice assembly 126 to allow flow (e.g., maximum or unrestricted attached-mode flow) through the orifice 128.

Notably, for the illustrated embodiment, in both the first and second orientations of the valve stem 336 (and throughout attached-mode operation), the mechanical stop 334 does not interact with a stop feature. Accordingly, during attached operation, although the engagement of the valve stem 336 with the lever 388 prevents the valve stem 336 from moving past the second orientation in a valve-opening direction, the mechanical stop 334 does not affect operation of the regulator 100.

In contrast, during disconnected operation, the valve stem 336 can move past the second orientation in a direction extending away from the orifice assembly 126, with corresponding increase in the permitted flow through the regulator 100. However, movement of the valve stem 336 sufficiently past the second orientation will eventually bring the mechanical stop 334 into a third position (see FIG. 3b) in which the mechanical stop 334 contacts a stop feature and thereby stops the valve stem 336 at a third orientation, with corresponding third positions for the mechanical stop 334 and the control element 332. Thus, for example, when the lever is disconnected from the valve stem 336 or the diaphragm 144 otherwise fails to control movement of the valve stem 336, the mechanical stop 334 can engage the relevant stop feature to limit a maximum permitted restriction at the orifice 128 and thereby prevent unrestrained flow through the regulator 100.

Figure 3B:
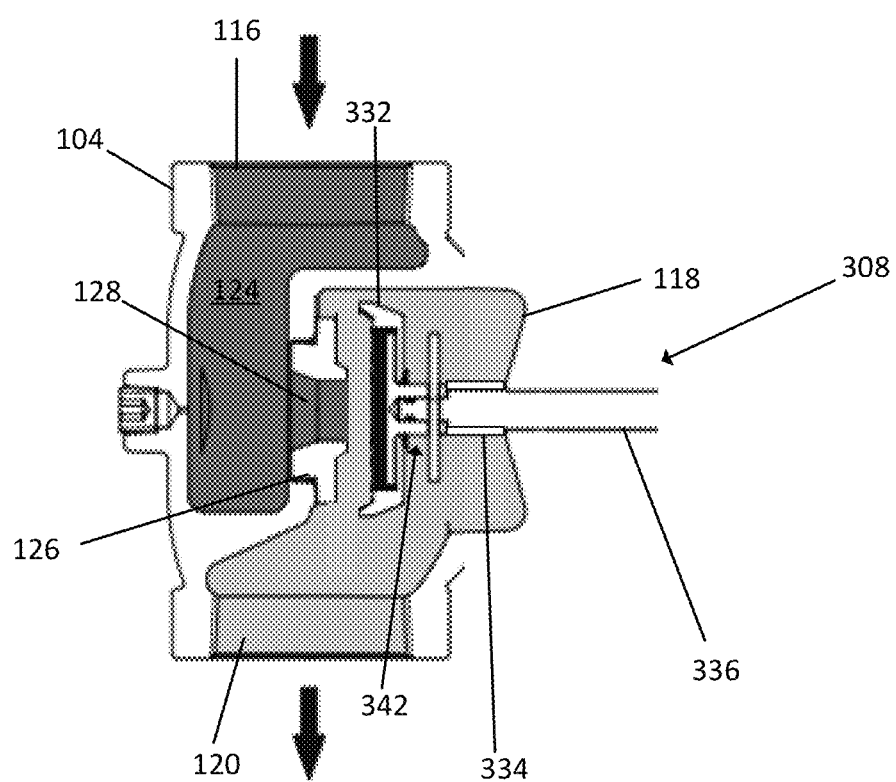

In different embodiments, different types and orientations of stop features can be used, including for stop features that are integral or preexisting features of a conventional regulator. For example, as illustrated in FIG. 3b, the wall 118 between the main flow path 124 of the regulator and the first chamber 150 provides a stop feature that contacts the sleeve of the mechanical stop 334 and thereby stops movement of the valve stem 336 in a valve opening direction once the mechanical stop 334, the valve stem 336, and the control element 332 reach the third positions (see FIG. 3b). In this regard, for example, the length and mounting location of the mechanical stop 334 along the valve stem 336 can be selected so that the mechanical stop 334 contacts the wall 118 when the control member 332 is an appropriate distance from the orifice assembly 126, such as may correspond to a maximum permitted flow restriction for disconnected-mode operation. Generally, in the third orientation, the control member 332 is separated from the downstream side 220 of the orifice assembly 126 by a greater distance than when the valve stem 336 is in the second orientation, but by a smaller distance than may occur if no mechanical stop is employed. Thus, although the mechanical stop 334 may not stop flow through the regulator 100, it may nonetheless limit flow to below an otherwise possible maximum.

Figure 3C:
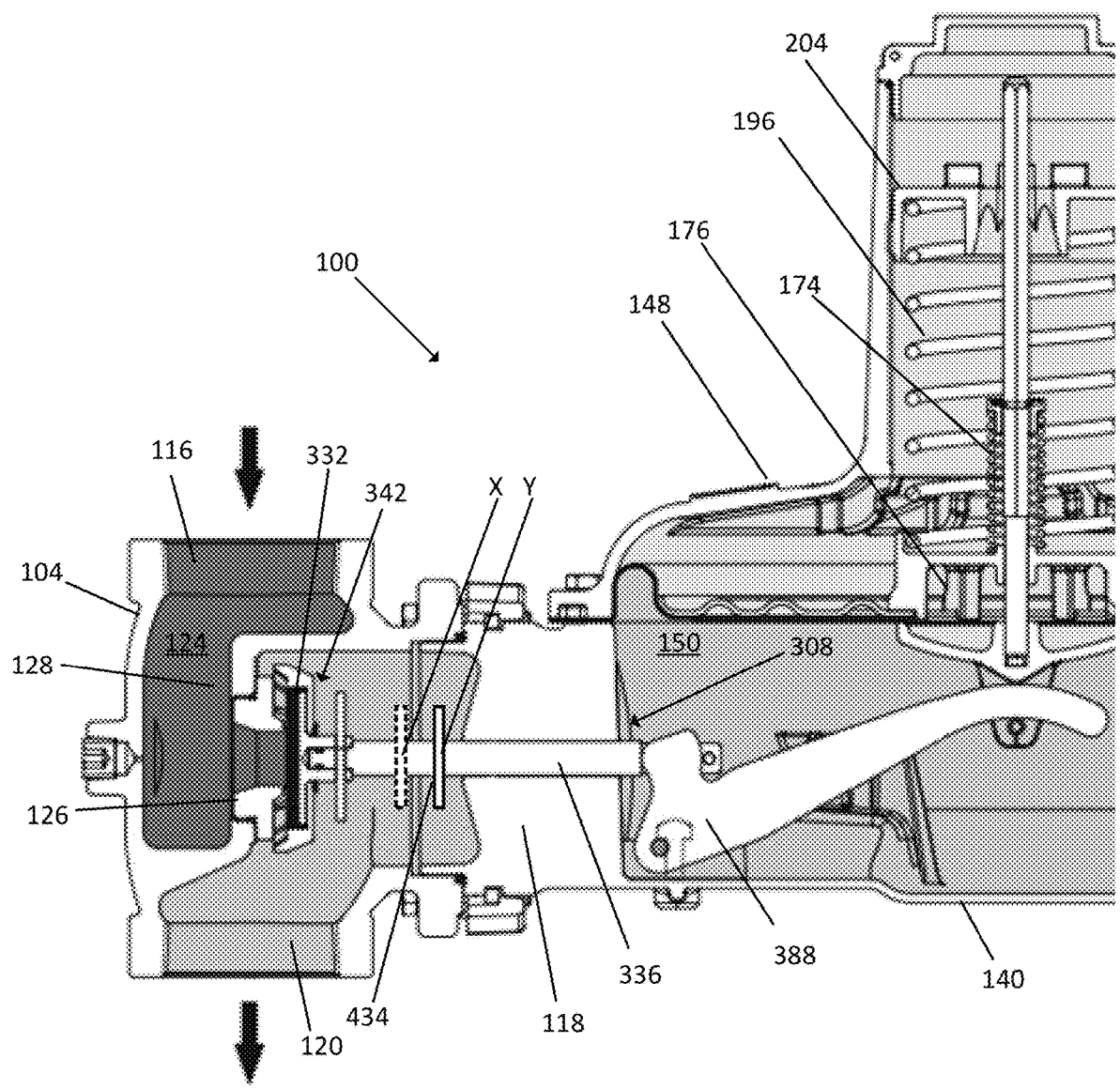

As also noted above, mechanical stops can be formed and installed in a variety of different ways. As shown in FIG. 3c, for example, a mechanical stop is formed as a pin 434 that extends through the valve stem 336, along an axis perpendicular to the longitudinal axis of the valve stem 336. The pin 434 can be mechanically coupled to the valve stem 336 in a number of locations, such as at location X or at location Y, with similar effects to changes in location or length of a sleeve (e.g., the mechanical stop 334) as discussed above. Also similarly to the mechanical stop 334, the pin 434 is configured to operate with the wall 118 as a stop feature, although other physical structures (e.g., other features on the valve body 104) can be used as stop features in other configurations. Accordingly, in an unattached mode of operation, contact between the pin 434 and the wall 118 can prevent the valve stem 336 from moving beyond a third position (not shown) in the valve-opening direction (i.e., to the right in FIG. 3c).

Figure 3D:
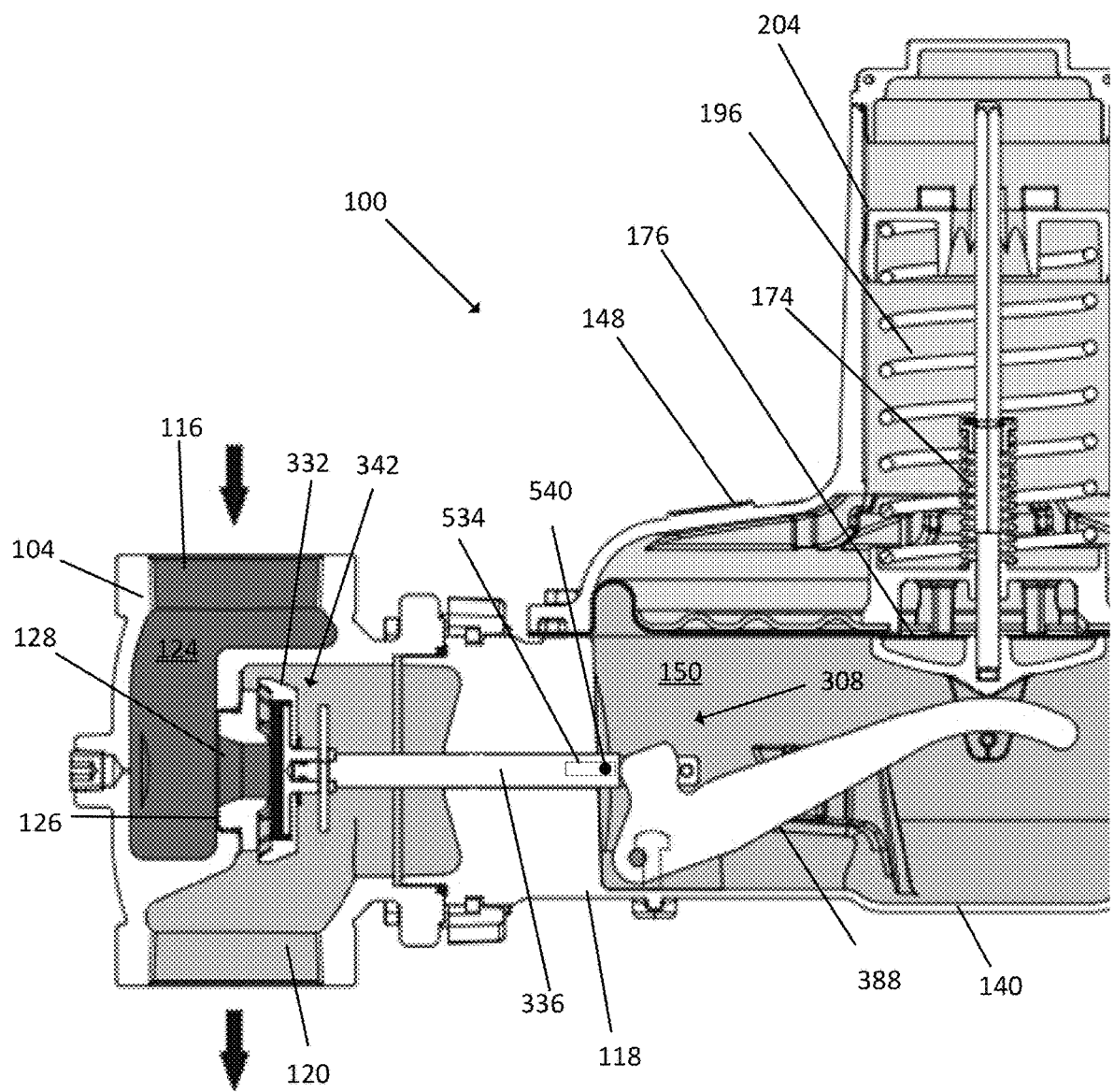

In some embodiments, a mechanical stop can be formed as a cavity or other recessed feature, which may be configured to receive a corresponding stop feature. For example, as illustrated in FIG. 3d, a mechanical stop is formed as a slot 534 in the valve stem 336. Correspondingly, a stop feature 540 is formed to extend into the slot 534 and to contact an end of the slot 534 (e.g., to the left, as shown) to prevent movement of the valve stem 336 past a certain orientation (not shown). The stop feature 540 can be formed in a variety of ways, including as an integral part of the wall 118, or other part of the regulator body 104, as part of a U-shaped or other bracket secured to the wall 118 within the chamber 150, a straight, L-shaped, or other pin that extends from the wall 118, the casing 140, or the casing 148, or otherwise. Thus arranged, for example, contact between the stop feature 540 and the ends of the slot 534 prevents translation of the valve stem 336 within the pressure regulator 100 so that the movement of valve stem 336 is bounded by the ends of the slot 534, relative to the location of the stop feature 540.

As also discussed above, the degree of flow restriction provided during disconnected (or other second-mode) operation can generally be controlled by the interaction between a mechanical stop and a corresponding stop feature. Accordingly, the geometry and placement of a mechanical stop and a stop feature can sometimes be selected based on the degree of flow restriction desired in a mode of operation in which the mechanical stop can contact the stop feature (e.g., during disconnected operation). For example, with regard to FIGS. 3a through 3d, the desired flow capacity out of the outlet 120 during disconnected operation can be selected, and the corresponding maximum distance that control member 332 can travel in the valve-opening direction (e.g., to the right, as shown) can then be calculated. The geometry and placement of the mechanical stops 334, 434, 534 and the corresponding stop features 340, 440, 540 can then be selected, as appropriate, based on the calculated maximum travel distance for the control member 332.

For example, the length of the sleeve of the mechanical stop 334 and the location of the sleeve on the valve stem 336 can be selected so that when the valve stem 336 is in the first orientation (see FIG. 3a), the distance between the end of the mechanical stop 334 and the wall 118 is substantially equal to the desired maximum travel distance of the control member 332. Accordingly, the mechanical stop 334 and the stop feature 340 can restrict the fluid flow through the fluid outlet 120 to be less than the fluid flow would be if the orifice 128 were completely unrestricted during disconnected operation. Similarly, the location and size of the pin 434, the slot 534, and the mechanical stop 540 can be selected, as desired, to ensure that flow through the regulator 100 can be appropriately restricted, even upon the lever 388 becoming disconnected from the valve stem 336.

For the embodiments illustrated in FIGS. 3a through 3d, the mechanical stops 334, 434, 534 and the stop features 340, 440, 540 are configured to enforce flow restrictions only during second-mode operation (e.g., not when the regulator 100 is operating normally). However, in some embodiments, the geometry and placement of a mechanical stop and a corresponding stop feature can be selected so that movement of a control element and, correspondingly, flow through the regulator can be restricted by the mechanical stop during attached operation.

Accordingly, the control assembly 308 can protect downstream devices from overpressure and reduce the required flow capacity of the internal relief valve 172 or other downstream relief valves. Thus, further embodiments of the invention can also provide improved performance for regulators, including through improvement over conventional flow-control assemblies. For example, upon a lever disconnect event, a mechanical stop control member can be automatically moved into contact with a stop feature to limit maximum flow through a regulator. In some cases, this arrangement can protect downstream devices from excessive overpressure and generally reduce the required flow capacity of internal or downstream relief valves.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A pressure regulator comprising:
 a valve body that defines a fluid flow path between an inlet and an outlet;
 an orifice assembly that is positioned along the fluid flow path, the orifice assembly including a first side and a second side opposite the first side;
 a stem;
 a lever configured to control movement of the stem when engaged with the stem, as driven by movement of a diaphragm;
 a primary control member that is coupled to the stem, wherein, in a first mode of operation of the pressure regulator, the primary control member is moveable relative to the first side of the orifice assembly, by movement of the stem, between: a first position in which the primary control member contacts the first side of the orifice assembly to restrict fluid flow along the fluid flow path, and a second position in which the primary control member is separated from the first side of the orifice assembly; and
 a secondary control member that is coupled to the stem and is movable relative to the second side of the orifice assembly, by movement of the stem, wherein:
  in the first mode of operation of the pressure regulator, the secondary control member is moveable between a first position and a second position, in each of which the secondary control member is separated from the second side of the orifice assembly; and
  in a second mode of operation of the pressure regulator, the secondary control member is movable to a third position in which the secondary control member contacts the second side of the orifice assembly to restrict fluid flow along the fluid flow path.

2. The pressure regulator of claim 1, wherein, in the first mode of operation, the lever is connected to the stem; and wherein, in the second mode of operation, the lever is disconnected from the stem.

3. The pressure regulator of claim 1, wherein, when in the third position, the secondary control member blocks the fluid flow path at the orifice assembly.

4. The pressure regulator of claim 1, wherein the primary and secondary control members move integrally with the stem.

5. The pressure regulator of claim 4, wherein the primary and secondary control members move in unison with each other.

6. The pressure regulator of claim 1, wherein, in the second mode of operation, the primary control member is movable to a third position in which the primary control member is separated from the first side of the orifice assembly by a greater distance than when the primary control member is in the second position.

7. The pressure regulator of claim 6, wherein the primary control member being in the third position corresponds to the secondary control member being in the third position.

8. The pressure regulator of claim 7, wherein the secondary control member contacting the second side of the orifice assembly stops the primary control member, via the stem, from moving farther away from the first side of the orifice assembly.

9. The pressure regulator of claim 1, wherein the secondary control member includes a disc that is configured to contact the second side of the orifice assembly when the secondary control member is in the third position.

10. The pressure regulator of claim 1, wherein the secondary control member includes a ramped surface that is configured to contact the second side of the orifice assembly when the secondary control member is in the third position.

11. The pressure regulator of claim 1, wherein the secondary control member is configured to be moved to the third position, in the second mode of operation, solely by the pressure of fluid along the fluid flow path.

12. A pressure regulator comprising:
a valve body that defines a fluid flow path between an inlet and an outlet;
an orifice assembly that is positioned along the fluid flow path;
a lever configured to be moved by movement of a diaphragm in a first mode of operation of the pressure regulator; and
a stem assembly that includes:
a stem that is operably coupled to the diaphragm in the first mode of operation and is operably decoupled from the diaphragm in a second mode of operation of the pressure regulator;
a primary control member that is coupled to the stem on a downstream side of the orifice assembly; and
a secondary control member that is coupled to the stem on an upstream side of the orifice assembly;
wherein, in the first mode of operation, the stem is movable between first and second orientations:
wherein, with the stem in the first orientation, the primary control member is in contact with a first side of the orifice assembly to block flow past the orifice assembly; and
wherein, with the stem in the second orientation, the primary control member is separated from the first side of the orifice assembly to permit flow past the orifice assembly; and
wherein, in the second mode of operation, the stem is movable to a third orientation:
wherein, with the stem moving from the second orientation towards the third orientation moves the secondary control member toward a second side of the orifice assembly to restrict flow past the orifice assembly.

13. The pressure regulator of claim 12, wherein, with the stem in the first and second orientations, the secondary control member is separated from the second side of the orifice assembly; and
wherein, with the stem in the third orientation, the secondary control member contacts the second side of the orifice assembly.

14. The pressure regulator of claim 13, wherein, with the stem in the second orientation, the secondary control member is separated from the second side of the orifice assembly by a smaller distance than when the stem is in the first orientation.

15. The pressure regulator of claim 12, wherein the primary and secondary control members cooperatively define a spacing therebetween so that a minimum flow area along the fluid flow path is defined, during the first mode of operation, by at least one of:
a spacing between the primary control member and the first side of the orifice assembly; or
a spacing between the secondary control member and the second side of the orifice assembly.

16. The pressure regulator of claim 12, wherein engagement of the stem and the lever stops movement of the stem in a valve-opening direction with the stem in the second orientation.

17. The pressure regulator of claim 16, wherein a maximum flow capacity of the pressure regulator is attained when the stem is in the second orientation.

18. The pressure regulator of claim 17, wherein, as the stem moves from the second orientation to the third orientation, corresponding movement of the secondary control member continually decreases the flow capacity of the pressure regulator.

19. A stem assembly for a pressure regulator, the pressure regulator including a valve body that defines a fluid flow path between an inlet and an outlet, an orifice assembly that defines a flow orifice along the fluid flow path, and a lever that is configured to be moved by movement of a diaphragm, the stem assembly comprising:
a stem that is configured to be moved by the lever in a first mode of operation of the pressure regulator and to move freely relative to the lever in a second mode of operation of the pressure regulator;
a primary control member that is coupled to the stem; and
a secondary control member that is coupled to the stem and is spaced apart from the primary control member by an extension portion of the stem;
the stem being configured to be installed in the pressure regulator with the extension portion extending through the flow orifice defined by the orifice assembly, and with the primary control member positioned downstream of the flow orifice and the secondary control member positioned upstream of the flow orifice.

20. The stem assembly of claim 19, wherein the primary control member is configured to contact a downstream side of the orifice assembly to restrict flow through the orifice assembly;
wherein the secondary control member is configured to contact an upstream side of the orifice assembly to restrict flow through the orifice assembly; and
wherein the extension portion of the stem is sized so that:
the secondary control member is separated from the upstream side of the orifice assembly when the primary control member contacts the downstream side of the orifice assembly; and
the primary control member is separated from the downstream side of the orifice assembly when the secondary control member contacts the upstream side of the orifice assembly.

* * * * *